United States Patent
Sohling et al.

(10) Patent No.: US 9,238,785 B2
(45) Date of Patent: Jan. 19, 2016

(54) METHOD FOR BIODIESEL AND BIODIESEL PRECURSOR PRODUCTION

(75) Inventors: Ulrich Sohling, Freising (DE); Friedrich Ruf, Ast (DE); Beate Geissler, Moosburg (DE); Herminia Millan, Condequinto Sevilla (DE)

(73) Assignee: Sued-Chemie IP GmbH & Co. KG, Munich (DE)

( * ) Notice: Subject to any disclaimer, the term of this patent is extended or adjusted under 35 U.S.C. 154(b) by 228 days.

(21) Appl. No.: 13/881,057

(22) PCT Filed: Oct. 26, 2011

(86) PCT No.: PCT/EP2011/068744
§ 371 (c)(1),
(2), (4) Date: Jun. 25, 2013

(87) PCT Pub. No.: WO2012/055909
PCT Pub. Date: May 3, 2012

(65) Prior Publication Data
US 2013/0263497 A1 Oct. 10, 2013

(30) Foreign Application Priority Data
Oct. 26, 2010 (EP) ..................................... 10188876

(51) Int. Cl.
| C11B 3/10 | (2006.01) |
| B01J 20/06 | (2006.01) |
| B01J 20/08 | (2006.01) |
| B01J 20/10 | (2006.01) |
| B01J 20/12 | (2006.01) |
| B01J 20/16 | (2006.01) |

(Continued)

(52) U.S. Cl.
CPC . *C11B 3/10* (2013.01); *B01J 20/06* (2013.01); *B01J 20/08* (2013.01); *B01J 20/103* (2013.01); *B01J 20/12* (2013.01); *B01J 20/165* (2013.01); *B01J 20/18* (2013.01); *B01J 20/28057* (2013.01); *B01J 20/28061* (2013.01); *B01J 20/28069* (2013.01); *C10L 1/026* (2013.01); *C11C 3/003* (2013.01); *B01J 2220/42* (2013.01); *Y02E 50/13* (2013.01)

(58) Field of Classification Search
CPC ........... C10L 1/026; C11C 3/003; C11B 3/10; B01J 20/06; B01J 20/08; B01J 20/103; B01J 20/12; B01J 20/165; B01J 20/18; Y02E 50/13
See application file for complete search history.

(56) References Cited

U.S. PATENT DOCUMENTS

| 4,629,588 A | 12/1986 | Welsh et al. |
| 8,097,049 B2 * | 1/2012 | Munson et al. ................. 44/385 |

(Continued)

FOREIGN PATENT DOCUMENTS

| EP | 0 185 182 A1 | 6/1986 |
| EP | 0 295 418 A2 | 12/1988 |

(Continued)

OTHER PUBLICATIONS

European Office Action mailed Nov. 20, 2014 for European Application No. 11 776 747.5-1352.

(Continued)

*Primary Examiner* — Cephia D Toomer
(74) *Attorney, Agent, or Firm* — RatnerPrestia

(57) ABSTRACT

The invention relates to a method for the production of biodiesel and biodiesel precursor.

11 Claims, 1 Drawing Sheet

(51) Int. Cl.
  *B01J 20/18* (2006.01)
  *B01J 20/28* (2006.01)
  *C10L 1/02* (2006.01)
  *C11C 3/00* (2006.01)

(56) References Cited

U.S. PATENT DOCUMENTS

| | | |
|---|---|---|
| 2007/0175091 A1 | 8/2007 | Danzer et al. |
| 2008/0223756 A1 | 9/2008 | Schurz |
| 2009/0199460 A1 | 8/2009 | Munson et al. |
| 2011/0099889 A1 | 5/2011 | Sohling et al. |
| 2011/0154723 A1* | 6/2011 | Sohling et al. ............ 44/307 |

FOREIGN PATENT DOCUMENTS

| | | |
|---|---|---|
| EP | 0 340 717 A2 | 11/1989 |
| EP | 0 361 622 | 4/1990 |
| EP | 0 376 406 | 4/1990 |
| EP | 0 389 057 | 9/1990 |
| EP | 0 507 217 A1 | 10/1992 |
| EP | 0 507 424 A1 | 10/1992 |
| EP | 1 893 329 B1 | 3/2008 |
| EP | 2 285 940 B1 | 2/2011 |
| WO | WO 93/23508 | 11/1993 |
| WO | WO 03/075671 A1 | 9/2003 |
| WO | WO 2007/076163 A2 | 7/2007 |
| WO | WO 2007/098928 A1 | 9/2007 |
| WO | WO 2008/051984 A1 | 5/2008 |
| WO | WO/2008/055675 A1 | 5/2008 |
| WO | WO 2008/055676 A1 | 5/2008 |
| WO | WO 2009/068274 A1 | 6/2009 |
| WO | WO 2009/106360 A2 | 9/2009 |
| WO | 2009132670 | 11/2009 |
| WO | WO 2010/102952 A1 | 9/2010 |

OTHER PUBLICATIONS

Sohling et al., "Natural mixture of silica and smectite as a new clayey material for industrial applications", Clay Minerals, (2009), vol. 44, pp. 525-537.
Taylor, "Bleaching", Bailey's Industrial Oil and Fat Products, (2005), Sixth Edition, Six vol. Set, pp. 285-339.
Vera Van Hoed et al., "Identification and Occurrence of Steryl Glucosides in Palm and Soy Biodiesel", *J. Am. Oil Chem. Soc.*, 85:701-709 (2008).
R. A. Moreau et al., "The Identification and Quantification of Steryl Glucosides in Precipitates from Commercial Biodiesel", *J. Am. Oil. Chem. Soc.* 85:761-770 (2008).
J. Środoń, "Identification and Quantitative Analysis of Clay Minerals", *Hand Book of Clay Science*, Elsevier, Oxford, Amsterdam, Chapter 12.2 pp. 765-787 (2006).
D. M. Moore et al., "Identification of Clay Minerals and Associated Minerals; X-Ray Diffraction and the Identification and Analysis of Clay Minerals", Oxford University Press, New York, Chapter 7, pp. 227-260 (1997).
D. M. Moore et al., "Quantitative Analysis; X-Ray Diffraction and the Identification and Analysis of Clay Minerals", Oxford University Press, New York, Chapter 9, pp. 298-329 (1997).
Barrett et al., *J. Am. Chem. Soc.*, vol. 73, pp. 373-380 (1951).
European Search Report EP 10 18 8876 dated Feb. 10, 2011.
International Search Report PCT/EP2011/068744 dated Dec. 1, 2011.
Lee et al., *Biodiesel Magazine*, pp. 1-3 (2007).
McCarty, *IUCr CPD Newsletter*, 27, (2002).
Mittelbach et al., *Biotechnology Journal*, pp. 102 (2006).
Sing et al., *Pure & Applied Chem.*, vol. 57, 4:603-19 (1985).
Tang et al, *Fuel*, 87:3006-17 (2008).
Yamaoka et al., *J. Jpn. Oil Chem. Soc.*, vol. 38, 7:572-76 (1989).

* cited by examiner

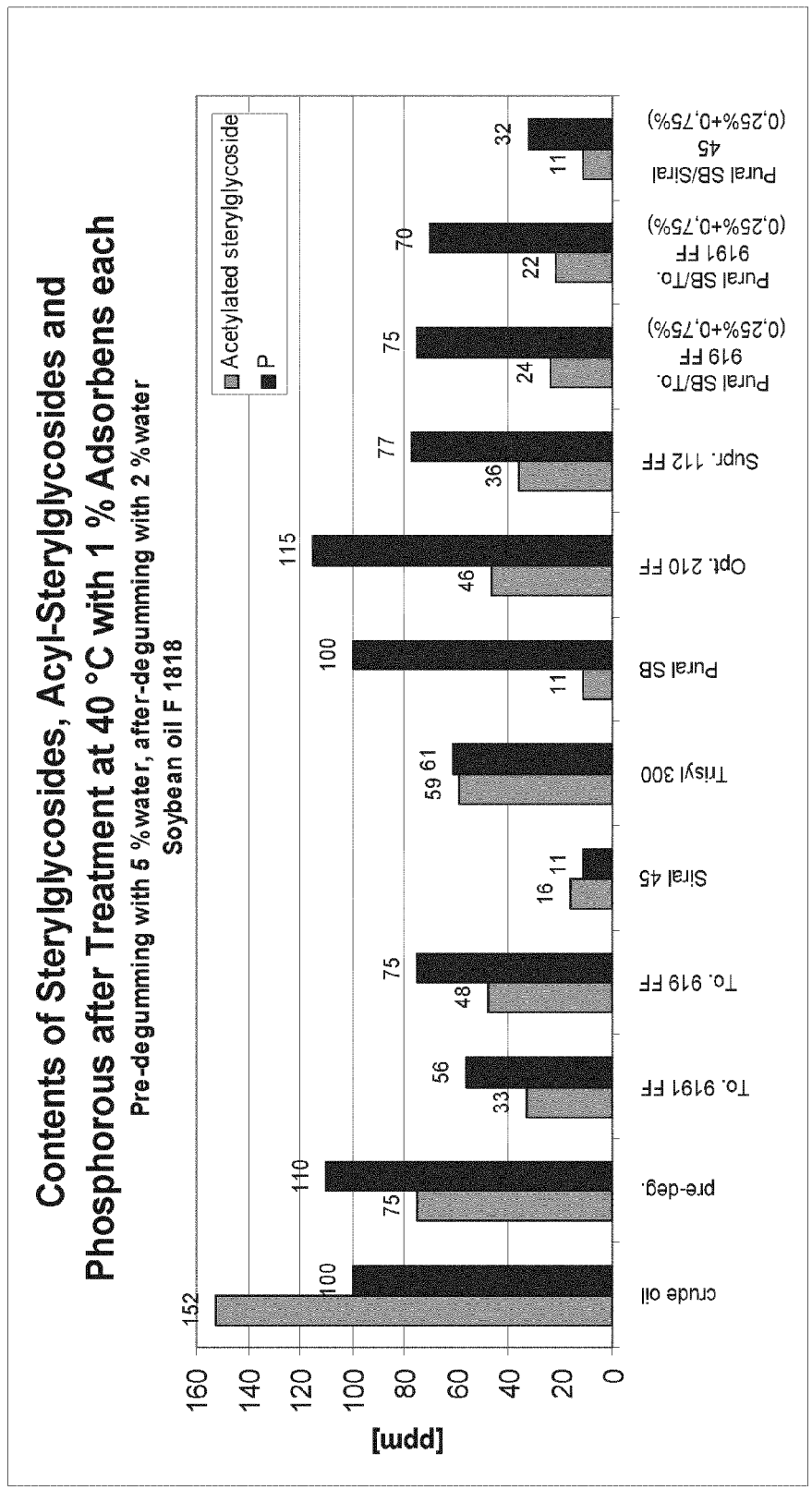

METHOD FOR BIODIESEL AND BIODIESEL PRECURSOR PRODUCTION

CROSS-REFERENCE TO RELATED APPLICATIONS

This application is a U.S. National Stage application, claiming benefit under 35 U.S.C. §§120 and 365 of International Application No. PCT/EP2011/068744, filed Oct. 26, 2011, and claiming benefit under 35 U.S.C. §119 of European Application No. 10188876.6, filed Oct. 26, 2010, the entire disclosures of both prior applications being incorporated herein by reference in their entirety.

BACKGROUND

The invention relates to a method for the production of biodiesel and biodiesel precursor.

Due to their neutral carbon dioxide balance and improved production processes biodiesel attracts increasing attention as an alternative to conventional petrochemical diesel fuel. In some countries, e.g. within the European Union, diesel fuel must contain a defined amount of biodiesel.

Biodiesel is derived from triglycerides by a transesterification or alcoholysis reaction in which one mole of triglyceride reacts with three moles of alcohol to form one mole of glycerol and three moles of the respective fatty acid alkyl ester. The process is a sequence of three reversible reactions, in which the triglyceride in a step by step reaction is transformed into diglyceride, monoglyceride and glycerol. In each step one mole of alcohol is consumed and one mole of the corresponding fatty acid ester is produced. In most processes performed on industrial scale, methanol is used as the alcohol. However, also biodiesel comprising an ethyl or propyl fatty acid ester is commercially available. In order to shift the equilibrium towards the fatty acid alkyl ester side, the alcohol, in particular methanol, is added in an excess over the stoichiometric amount in most commercial biodiesel production plants. A further advantage of the methanolysis of triglycerides is that during the reaction glycerol and fatty acid methyl ester is produced as the main products, which are hardly miscible and thus form separate phases with an upper ester phase and a lower glycerol phase. By removing glycerol from the reaction mixture a high conversion rate may be achieved.

Details to the manufacturing of Biodiesel may be found at M. Mittelbach, C. Remschmidt, "Biodiesel The comprehensive Handbook", Graz, 2004; ISBN 3-200-00249-2.

To achieve a defined combustion of the biodiesel it is necessary to decrease the amount of residual mono-, di-, and triglycerides as well as of soaps and glycerol as far as possible. According to DIN EN 14214, biodiesel may contain up to 0.2 wt.-% monoglycerides, up to 0.8 wt.-% diglycerides and up to 0.2 wt.-% triglycerides. In usual practice therefore a water wash is performed to remove soaps as well as residual methanol, glycerol and mono- and diglycerides.

As biodiesel is produced from natural raw materials the concentrations of impurities as well as their composition are varying within wide ranges. This could lead to difficulties during the production of biodiesel. Often smaller amounts of fine precipitations are built which may lead e.g. to filter plugging when biodiesel is cooled down to ambient temperature after production or when stored over a longer period of time. One kind of substances which lead to precipitations in biodiesel produced by transesterification of vegetable oil are glycosides and especially sterylglycosides. Sterines are steroids deriving from cholesterine which have a hydroxyl group only at the position C-3, but apart from that do not have any functional group. Mostly they show a double binding in the 5/6 position, more seldom also in positions 7/8 or 8/9. Formally they represent alcohols and therefore are often designed as sterols. Naturally occurring sterylglycosides often comprise—beside the glycoside bound sterine—a fatty acid with which the primary hydroxyl group of the sugar is acylated. Therefore they are very well soluble in vegetable and animal oils and fats. These non-acylated sterylglycosides are nearly insoluble in biodiesel. Therefore they are present as very fine floating particles which can for instance act as germs for the crystallisation of other compounds. Consequently, difficulties caused for example by monoglycerides still present in the biodiesel can be reinforced. Non-acylated sterylglycosides in very small concentrations can already lead to precipitation of solid aggregates from the biodiesel. At room temperature concentrations in a two-digit ppm range can already cause the formation of turbidities in the biodiesel. Non-acylated sterylglycosides show a very high melting point of around 240° C. Therefore, turbidities or precipitations caused by non-acylated sterylglycosides cannot be simply solved by heating up the biodiesel to a higher temperature. When there are already deposits on the filter, the filter will be completely plugged within a short time when non-acylated sterylglycosides are present in the biodiesel.

After the production process the biodiesel is finally investigated. When it is stated that the test with respect to the filter plugging is not passed, because the actually final biodiesel still contains small amounts of non-acylated sterylglycoside, this biodiesel cannot be released.

A process, known from the state of the art, for the separation of components as for example sterylglycosides from biodiesel, is based on cooling down the crude biodiesel to low temperatures and subsequent filtration. Alternatively, the precipitation deriving from sterylglycosides can be removed by centrifugation. These processes, however, are very time and work-intensive.

Another critical contamination of the biodiesel is phosphorous in the organically bound form. It is introduced into the biodiesel by phosphatides (phospholipids). The current European legislation (EN 14 214) limits the P content of the final biodiesel to 4 ppm. In addition, it is to be expected that the limit for phosphor and also sterylglycosides will be further decreased.

In the current biodiesel production the phosphatides are removed at the stage of the oil. This means that the producers of biodiesel need either to employ/purchase oil with a low phosphatide content or to pre-treat the oils. The removal of the phosphatides from the edible oil is called degumming. This process as currently practised within the state of the art involves the treatment of the crude oil with water and/or an aqueous acid. This treatment will, however, not sufficiently remove the phosphor-compounds to obtain an oil which is—after a biodiesel production process—already compliant with the current EU norm EN 14214.

Adsorbents for the phosphatide removal and the reduction of metal ions from vegetable oils are already available on the market, as for example a silica gel based adsorbent of the company Grace which is sold under the brand name Trisyl®. Furthermore bleaching earth based adsorbents are available on the market from Süd-Chemie AG, Moosburg.

The patent EP 0185182 B1 (equivalent to U.S. Pat. No. 4,629,588) from Grace describes an amorphous silica gel with pore diameters between 60 and 5000 Å being suitable for the removal of metal traces from triglycerides. Here it is especially pointed to the application in soybean oil.

In a series of further patents Trisyl® is now combined with other adsorbents resp. the amorphous silicium is combined with other patents resp. further surface modified. So, the patent EP 340717 A2 from Grace describes a two-phase (two-step) adsorption resp. treatment of vegetable oil, whereby the oil is contacted with an amorphous silica gel in the first step in order to remove the phospholipids and soaps. In a second step it is conducted through a packed bed of bleaching earth in order to remove the pigments (coloured bodies). Other patents covering the use of silica in degumming are EP 295418 B1 from Grace, EP 507217 A1 from Grace and EP 0507424 A1 from Grace.

The consequences of the sterylglycoside content on the quality of biodiesel and the analytics of sterylglycosides are described e.g. in: Identification and Occurrence of Steryl Glycosides in Palm and Soy Biodiesel, V. van Hoed et al., J. A, Oil Chem. Soc. (2008) 85, 701-709, in: The Identification and Quantification of Steryl Glycosides in Precipitates from Commercial Biodiesel, R. A. Moreau, K. M. Scott, M. J. Haas, J. Am. Oil. Chem. Soc. (2008) 85, 761-770 and in Fuel properties and precipitate formation at low temperature in soy-, cottonseed-, and poultry fat-based biodiesel blends, Tang, H. et al., Fuel 87 (2008) 3006-3017. Additional details can be found in the Patent WO 2010102952 (A1) from Novozymes.

Sterylglycosides are glycosides from a sterol, e.g. sitosterol and a sugar, e.g. glucose. In plant tissues and in vegetable oils, sterylglycosides occur naturally in both free sterylglycosides (FSG) and acylated sterylglycosides (ASG) forms. In the latter, the 6-position of the sugar is esterified with a long chain fatty acid. Under alkaline conditions, this ester bond between the glucose and the fatty acid is broken, and an acylated sterylglycoside is converted into its free form. Such a side reaction occurs during transesterification, resulting in an increased FSG concentration in biodiesel in comparison to their initial amount in the feedstock oil.

Modern engines feature a sophisticated design involving fine openings for fuel injection, protected by dedicated filters. The content of insoluble contaminants in biodiesel is a closely monitored parameter, since an excess of them might cause operational problems in vehicles due to clogging of the engine filters.

Excessive sedimentation may occur in biodiesel well above its cloud point. This phenomenon is frequently detected in soy and palm biodiesel and induces a number of undesired consequences at both the production and quality control stages. In the beginning of crystallization a cloud of tiny particles is dispersed through the entire volume of the biodiesel. It causes a hazy appearance of the product, marked by the loss of transparency and brilliancy. As sedimentation progresses, deposits are formed on the bottom of biodiesel storage tanks. In particular cases the haze manifests itself within a short time delay after biodisel production and at rather high temperatures (60° C.). Then the progress equipment upstream of the tank farm is affected, and frequent maintenance of fouling heat exchangers and centrifuges may be necessary. As a result, the haze impedes the product from meeting the requirements on contamination/filterability according to the biodiesel quality standards, e.g. European norm EN14214 and ASTM D6751 adopted in the US.

Recently, the problem of deposits on plugged vehicles filters was linked to the presence of free sterylglycosides (FSG) in blended fuel systems.

Accordingly, the removal of sterylglycosides from biodiesel is therefore often necessary and a few methods based on filtering or adsorption are indicated in WO 2007/076163 which describes a process for treating biodiesel by contacting it with a compound being capable of removing sterylglycosides from the biodiesel by adsorption; US 2007/0175091 which describes a method for removing impurities from biodiesel comprising: (a) converting a feedstock into biodiesel having a temperature exceeding 98° C.; (b) cooling the biodiesel to a temperature range sufficient to form particulates of impurities; and (c) filtering the cooled biodiesel to remove the particulates; and WO 2008/051984 which describes a method of passing a biodiesel stream through a filter having a molecular weight cut-off of less than 1,000,000 g/mol.

However, these methods of physically removing sterylglycosides are associated with a yield loss of biodiesel. Therefore there is still a need for alternative processes to remove sterylglycosides from biodiesel with low yield-loss, to provide products that are able to meet the biodiesel quality standards on contamination and filterability and which do not suffer from fuel filter plugging problems.

One alternative are enzymatic processes for biodiesel treatment as described e.g. in WO 2009106360 A2, the other is to remove the sterylglycosides already from the vegetable oil together with the degumming.

The publication "Glycolipids of the Recovered Palm Oil from Spent Earth in the Physical Refining Process" by M. Yamaoka, P. Jenvanitpanjakul, A. Tanaka, J. Jpn. Oil Chem. Soc. Vol. 38, No. 7 (1989), pp 572 describes the enrichment of glycolipids in spent bleaching earth.

For the efficiency of the entire production process of biodiesel from edible oil, it is a drawback to remove phosphatides in oil in a first step and—at a later stage and in a second step after the production of biodiesel—to lower the content of sterylglycosides in the biodiesel. Therefore the entire process would be much more efficient if at the stage of the oil the sterylglycosides could be removed together with the phosphatides in one step. Further, in case there would be a possibility to remove non-acylated but also acylated sterylglycosides from the crude oil, no formation of new non-acylated sterylglycosides would take place during the biodiesel production process.

SUMMARY

Thus, there is a need for an improved and simplified method to pre-treat crude and/or degummed oils and fats before subjecting them to the biodiesel production process. In addition, there is a particular need for a method to remove phosphatides and sterylglycosides before subjecting the oil to a biodiesel production process.

Surprisingly it has been found that phosphatides and sterylglycosides can be removed from edible oil at the same time. This can be either achieved with suitable single adsorbents showing significant adsorption capacities for both, phosphatides and sterylglycosides, or a mixture of adsorbents.

The present invention relates therefore to a method for the production of biodiesel and biodiesel precursor, comprising the steps a) Providing crude plant oil with a phosphor-content of more than 4 ppm and a sterylglycoside-content of more than 5 ppm;

b) Contacting said crude plant oil from step a) with at least one adsorbent;

c) Separating the adsorbent from the oil.

The method according to the present invention enables the production of biodiesel without further pre- or post treatments regarding the removal of both phosphor and (non-)acylated sterylglycosides. The crude oil obtained by the method according to the present invention can be directly subjected to a biodiesel production process whereas the biodiesel will automatically be compliant with the EU norm EN 14214 regarding the phosphor and sterylglycoside contents. Thus, there is no need for time and work-consuming separate treatment of the biodiesel as especially non-acylated sterylglycosides will have been already removed from the crude oil and new non-acylated sterylglycosides cannot be formed during the biodiesel production process due to a removal also of the acylated sterylglycosides from the crude oil.

DETAILED DESCRIPTION

Thus, a preferred embodiment of the present invention is directed to a process as defined before but further comprising the step of d) subjecting the oil obtained from step c) to a biodiesel production process. Here, the biodiesel production process is carried out directly after the separation of the adsorbent from the oil (step c) without further (pre)treatments and removal of substances necessary. The biodiesel obtained after the biodiesel production process of step d) is biodiesel already compliant with the EU norm EN 14214 regarding the contents of sterylglycosides and phosphor. In a further preferred embodiment of the present invention the method as defined before further comprises the step e) obtaining biodiesel compliant with the EU norm EN 14214 from step d) regarding the contents of phosphor and sterylglycosides. Hereby it needs to be considered, that there exists currently no specification of the Sterylglycoside content itself in EU 14214 but the solid residues created by sterylglycosides are contained in the specification for the limits for the total contamination (solid particles, limit 24 mg/g) determined by the Test method EN 12662.—Limits for Sterylglycosides are actually under discussion.

When producing biodiesel according to the method of the present invention there is no need for time and work consuming refining of the crude biodiesel to remove phosphor and in particular sterylglycosides as they have already been removed from the crude oil. In addition, new non-acylated sterylglycosides will not be formed during the biodiesel production process as acylated sterylglycosides have already been removed from the crude oil. The method of the present invention therefore provides many and significant advantages over the methods and processes currently practised and known from the state of the art.

Crude oils used as starting materials in the biodiesel and biodiesel precursor production may be obtained e.g. from plant sources or animal fat sources. Preferred oils to be used in the method according to the present invention are rapeseed oil, sunflower seed oil, soybean oil, palm oil and also possible blends of these oils. Linseed oil, beef tallow and recycled frying oil, Jatropha oil and oils from algae are also suitable. Generally, however, the method of the present invention can be applied to any oil from plant or animal source known to a person skilled in the art. The crude oil treated within the method of the present invention has a phosphor content of more than 10 ppm, preferably of more than 15 ppm and most preferred of more than 20 ppm. Further, the crude oil treated within the method of the present invention has a sterylglycoside content of more than 10 ppm, preferably more than 15 ppm and most preferred more than 20 ppm.

Biodiesel is derived from triglycerides by a transesterification or alcoholysis reaction in which one mole of triglyceride reacts with three moles of alcohol to form one mole of glycerol and three moles of the respective fatty acid alkyl ester. The process is a sequence of three reversible reactions, in which the triglyceride in a step by step reaction is transformed into diglyceride, monoglyceride and glycerol. In each step one mole of alcohol is consumed and one mole of the corresponding fatty acid ester is produced. In most processes performed on industrial scale, methanol is used as the alcohol. However, also biodiesel comprising an ethyl or propyl fatty acid ester is commercially available. In order to shift the equilibrium towards the fatty acid alkyl ester side, the alcohol, in particular methanol, is added in an excess over the stoichiometric amount in most commercial biodiesel production plants. A further advantage of the methanolysis of triglycerides is in that during the reaction glycerol and fatty acid methyl ester is produced as the main products, which are hardly miscible and thus form separate phases with an upper ester phase and a lower glycerol phase. By removing glycerol from the reaction mixture a high conversion rate may be achieved. The transesterification may be performed as a single step process or a multi step process. In the latter process only a portion of the required methanol is added in each step and the glycerol phase is separated after each process step. Methanol has only a poor solubility in oils and fats and, therefore, in the beginning of the transesterification process the upper methanol phase and the lower oil phase have to be mixed thoroughly. During methanolysis fatty acid methyl esters are produced which are readily miscible with methanol. Further, partial glycerides and soaps may act as emulsifiers between the starting materials and thus, the reaction mixture becomes homogenous after an initial induction period. In the further course of the reaction increasing amounts of glycerol are produced which are not miscible with the fatty acid methyl esters and, therefore, a phase separation is established with an upper ester phase and a lower glycerol phase.

The alcoholysis of triglycerides is catalysed by an alkaline or an acidic catalyst. Alkaline catalysis is by far the most commonly used reaction type for commercial biodiesel production. Alkaline catalysed transesterification may be performed advantageously under mild conditions and high conversion rates and, therefore, requires comparatively short reaction times. Moreover, basic catalysts are less corrosive to industrial equipment, so that they enable the use of less expensive carbon-steel material. In most commercial biodiesel production plants transesterification is performed with homogenous alkaline catalysis. The alkoxide anion required for the reaction is produced by directly dissolving an alkali alcoholate in the alcohol, by reacting the alcohol with pure alkali metal or, in case of methanolysis, by adding an alkali hydroxide to the methanol. Due to the fast separation of the glycerol phase in alcoholysis of triglycerides most of the alkaline catalyst is removed from the reaction mixture and, thus, the produced fatty acid esters will hardly get into contact with the hydroxide and, therefore, only a low tendency for soap formation exists. The catalyst is usually added in an amount of about 0.5 to 1.0% based on the weight of the oil. Details to the manufacturing of Biodiesel may be found at M. Mittelbach, C. Remschmidt, "Biodiesel The comprehensive Handbook", Graz, 2004; ISBN 3-200-00249-2. Alternatively to Methanol other alcohols can be employed for biodiesel production. Especially Bioethanol is one potential alternative for the methanol.

In a further preferred embodiment according to the present invention the at least one adsorbent is added to the crude oil in an amount of preferably 0.1 to 10 wt.-%, more preferred 0.2 to 7 wt.-%, further preferred 0.3 to 6 wt.-%, also preferred 0.5 to 5 wt.-% and most preferred in an amount of 1 to 4 wt.-%. The percentages refer to the amount of crude oil used in the method according to the invention. Thus, the method of the present invention is particularly advantageous as only a small amount of adsorbent is sufficient to fully remove two substances from the crude oil at one time.

In a further preferred embodiment according to the present invention the at least one adsorbent is added to the crude oil, preferably with stirring.

In another preferred embodiment according to the present invention the contacting according to step b) of the crude oil and the at least one adsorbent is carried out at a temperature of from 10 to 100° C. A preferred temperature range is from 15 to 90° C., preferably 20 to 80° C. and most preferred from 21 to 60° C. The normal temperature is 95° C. when the customer work with oils.

The method according to the present invention is preferably carried out at vacuum pressure. Further, a pressure between 1 and 3.5 bar, preferably between 1.5 and 3 bar and also preferred between 1.7 and 2 bar is possible.

Contacting of the crude oil with the at least one adsorbent according to step b) of the method of the present invention is preferably carried out for at least 1 minute, more preferred for 2 minutes to 12 hours, further preferred for 5 minutes to 6 hours, also preferred for 10 minutes to 3 hours and most preferred for 20 minutes to 1.5 hours.

After treatment, the at least one adsorbent is separated from the oil by known methods, e.g. sedimentation, centrifugation or filtration.

In a particular preferred embodiment of the present invention, the crude oil is subjected to a pre-degumming process before contacting the crude oil with the at least one adsorbent. This treatment is carried out with water and/or an aqueous solution of an acid, as for example phosphoric acid, citric acid or acetic acid. After addition of some of these acids, it is possible to add caustic soda to neutralize part of this acid. The changes in the pre-degumming process will depend on the starting oils and the plant conditions defined by the customer.

When subjecting the crude oil to a pre-degumming with water and/or an aqueous acid, in the following the amount of the at least one adsorbent used and/or the contacting time of the at least one adsorbent and the crude oil according to step b) can be considerably reduced. Thus, an amount of from 0.3 to 5 wt.-% combined with a contacting time of from 15 minutes to 1.5 hours is particularly preferred when combining the method according to the present invention with a pre-degumming process.

In order to achieve high adsorption capacities a high porosity and/or high specific surface area are favourable. In a further preferred embodiment according to the present invention the BET surface of the at least one adsorbent is at least 20 m$^2$/g, preferably at least 70 m$^2$/g, especially preferred at least 100 m$^2$/g, further preferred at least 120 m$^2$/g and most preferred at least 180 m$^2$/g. Preferably, adsorbents are used which have a very high surface area of from 120 to 350 m$^2$/g, more preferred 180 to 280 m$^2$/g, particularly preferred 190 to 250 m$^2$/g as determined by the BET method.

In another preferred embodiment according to the present invention the at least one adsorbent has a total pore volume according to BJH of at least 0.2 ml/g, preferably at least 0.25 ml/g, further preferred at least 0.35 ml/g, also preferred at least 0.45 ml/g and most preferred at least 0.55 ml/g. Furthermore, in a preferred embodiment according to the present invention the at least one adsorbent has a total pore volume of less than 1.2 ml/g, preferably less than 1.0 ml/g and most preferred less than 0.8 ml/g. The larger the pore volume of the adsorbent, the more rapid is the access of the oil to the adsorbent. This leads automatically to a more efficient purification of the crude oil. One particular advantage of the method according to the invention is therefore based on improved kinetic effects.

In a further preferred embodiment according to the present invention the at least one adsorbent (calculated as SiO$_2$) is at least 45 wt.-%, more preferred at least 55 wt.-%, particularly preferred at least 65 wt.-% and most preferred of at least 70 wt.-%. According to another preferred embodiment of the present invention, the silicon content of the at least one adsorbent (calculated as SiO$_2$) is less than 95 wt.-%, preferably less than 85 wt.-% and most preferred less than 80 wt.-%.

The particle size of the adsorbent material is adjusted such that the adsorbent material may be separated without difficulties from the purified oil by a suitable method, e.g. filtration, sedimentation or centrifugation within a suitable time period. The dry residue of the adsorbent material on a sieve of a mesh size of 63 μm preferably is within a range of 20 to 40 wt.-% and the dry residue on a sieve of a mesh size of 25 μm preferably is within a range of 50 to 65 wt.-%. However, the adsorbent material may also be provided in the form of e.g. granules, preferably having a diameter of 0.1 to 5 mm, preferred of 0.2-1 mm.

In another preferred embodiment according to the present invention at least 60% of the pores of the at least one adsorbent have a pore diameter of at least 140 Å, preferably 65 to 70% of the total pore volume of the adsorbent is provided by pores having a pore diameter of at least 140 Å. Further, at least 40%, preferably at least 50%, particularly preferred 55 to 60% of the total pore volume is provided by pores having a pore diameter of less than 250 Å, and at least 20%, particularly preferred 21 to 25% of the total pore volume is provided by pores having a pore diameter of 140 to 250 Å. Preferably less than 20% of the total pore volume, particularly preferred less than 15%, most preferred 10 to 14% of the total pore volume is formed by pores having a diameter of >800 Å.

Further preferred, at least 20%, preferably at least 25%, particularly preferred at least 30% and most preferred 33 to 40% of the total pore volume of the at least one adsorbent is provided by pores having a pore diameter of less than 140 Å.

Further preferred, at least 10%, preferably at least 13%, particularly preferred 15 to 20% of the total pore volume of the at least one adsorbent is provided by pores having a pore diameter of 75 to 140 Å.

Still further preferred, less than 40%, preferably less than 35%, particularly preferred 25 to 33% of the total pore volume of the at least one adsorbent is formed by pores having a pore diameter of 250 to 800 Å.

Also preferred, preferably at least 12%, particularly preferred at least 14%, most preferred 15 to 20% of the total pore volume is provided by pores having a pore diameter of less than 75 Å.

Further, preferably less than 80%, more preferred less than 75%, particularly preferred 60 to 70% of the total pore volume of the at least one adsorbent is formed by pores having a pore diameter of more than 140 Å.

Further preferred, less than 60%, preferably less than 50%, particularly preferred 40 to 45% of the total pore volume of the at least one adsorbent is formed by pores having a pore diameter of at least 250 Å.

Preferred ranges of the total pore volume in relation to the pore diameter are summarized in the following table 1:

TABLE 1 preferred percentages of the total pore volume formed
by pores of a distinct pore diameter for an adsorbent
used in a method according to the present invention

| pore diameter | preferred | particularly preferred | most preferred |
|---|---|---|---|
| 0-75 Å | >12% | >14% | 15-20% |
| 75-140 Å | >10% | >13% | 15-20% |
| 140-250 Å | >15% | >20% | 21-25% |
| 250-800 Å | <40% | <35% | 25-33% |
| >800 Å | <20% | <15% | 10-14% |

TABLE 2 preferred percentages of the total pore volume formed
by pores of a distinct pore diameter for an adsorbent
used in a method according to the present invention

| pore diameter | preferred percentage | particularly preferred percentage |
|---|---|---|
| 0-250 Å | >55% | 60-80% |
| 0-800 Å | <90% | 70-85% |
| >800 Å | <30% | 10-25% |
| 75-140 Å | <40% | 20-35% |
| 140-250 Å | <25% | 10-20% |
| 250-800 Å | <20% | 5-20% |
| 75-800 Å | <65% | 50-60% |
| >75 Å | <85% | 60-80% |
| >140 Å | <60% | 30-50% |
| >250 Å | <40% | 25-35% |

In a further preferred embodiment according to the present invention the at least one adsorbent is selected from the group consisting of clays, organic oxides, synthetic inorganic oxides, and mixtures thereof.

In a particularly preferred embodiment according to the present invention the at least one adsorbent is selected from the group consisting of pyrophyllites, sepiolites, attapulgites, smectites, vermiculites, Si-oxides, Al-oxides, Mg-oxides, Zn-oxides, Ti-oxides, and mixtures thereof.

A broad range of synthetic inorganic materials can be also applied according to the invention. Specially preferred are aluminum hydroxides, oxide hydroxides and aluminium oxides as well as the corresponding amorphous alumosilicates. Preferred alumosilicates have a $Fe_2O_3$ content of less than 0.2 wt.-%, preferably less than 0.1 wt.-% and most preferred less than 0.05 wt.-%. Further preferred are alumosilicates with a $Na_2O$ content of less than 0.05 wt.-%, preferably less than 0.01 wt.-%, further preferred less than 0.008 wt.-% and most preferred less than 0.005 wt.-%. Also preferred are alumosilicates with a C content of less than 0.5 wt.-%, preferably less than 0.4 wt.-%, further preferred less than 0.3 wt.-% and most preferred less than 0.2 wt.-%.

According to a preferred embodiment, the at least one adsorbent consists of a mixture of a smectitic clay and an amorphous silica phase. This preferred adsorbent material is homogenous on a macroscopic scale, i.e. it is an intimate mixture of both phases. The presence of a smectitic phase can be detected by the methylene blue adsorption test described further below. This preferred adsorbent material preferably comprises a continuous phase of amorphous silica into which small platelet-shaped smectite phases are inserted. The platelets of the smectite phase are homogeneously distributed in the continuous amorphous silica phase and firmly fixed therein. This preferred adsorbent may comprise a matrix-like network of amorphous $SiO_2$ into which very small clay particles are inserted. The smectite particles are preferably delaminated to a high degree and therefore provide a very high surface area for adsorption of phosphor-containing compounds and sterylglycosides. Another advantage of this preferred adsorbent material is that it does hardly swell during the adsorption process.

Preferably, the at least one adsorbent used in the method according to the invention comprises at least 10 wt.-%, particularly preferred more than 20 wt.-% and most preferred more than 30 wt.-% of an amorphous phase. According to a preferred embodiment of the invention, the amorphous phase forms less than 90 wt.-%, according to a further embodiment less than 80 wt.-%, according to a preferred embodiment less than 75 wt.-%, most preferred less than 70 wt.-% of the adsorbent material. The amorphous phase is preferably formed from $SiO_2$.

In a further preferred embodiment, the at least one adsorbent preferably comprises a smectite phase. Thus, in a preferred embodiment, the at least one adsorbent preferably comprises less than 60 wt.-%, more preferred less than 50%, particularly preferred less than 40 wt.-% of a smectite phase. According to a further preferred embodiment of the invention, the smectite phase forms at least 10 wt.-%, according to a further embodiment at least 20 wt.-% of the adsorbent. Generally, in case the adsorbent comprises a smectite phase and an amorphous phase, the ratio smectite phase/amorphous phase preferably is within a range of 2 to 0.5, more preferred 1.2 to 0.8.

In case the at least one adsorbent used in the method according to the invention comprises a matrix preferably formed from silica gel and a smectite phase, the matrix dilutes the smectite phase which leads, depending on the fraction of the smectite phase, to a lowering of the signal-to-noise ratio of typical reflections of smectite minerals. E.g. the small angle reflections of montmorillonite are effected by the periodic distance between layers of the montmorillonite structure. Further, the clay particles fixed in the $SiO_2$-matrix are delaminated to a very high degree leading to a strong broadening of the corresponding diffraction peak.

In an XRD-diffractogram of an adsorbent comprising a matrix preferably formed from silica gel and a smectite phase the reflexes are hardly visible above noise. The ratio signal noise for reflexes regarding the adsorbent material, in particular the smectite phase, is according to this preferred adsorbent close to 1 and may be preferably within a range of 1 to 1.2. However, sharp reflexes may be visible in the diffractogram originating from impurities of the adsorbent material, e.g. quartz. Such reflexes are not considered for determination of the signal/noise ratio.

Preferably the preferred at least one adsorbent used in the method according to the invention comprising a matrix preferably formed from silica gel and a smectite phase does not or does hardly show a 001 reflection indicating the layer distance within the crystal structure of bentonite particles. Hardly visible means that the signal-to-noise ratio of the 001 reflection of the smectite particles is preferably less than 1.2, particularly preferred is within a range of 1.0 to 1.1.

The amount of amorphous silica phase and smectite clay mineral phase present in the at least one adsorbent used in a preferred method according to the invention may be determined by quantitative X-ray-diffraction analysis. Details of such method are described e.g. in "Hand Book of Clay Science", F. Bergaya, B. K. G. Therry, G. Lagaly (Eds.), Elsevier, Oxford, Amsterdam, 2006, Chapter 12.1: I. Srodon, Identification and Quantitative Analysis of Clay Minerals; "X-Ray Diffraction and the Identification and Analysis of Clay Minerals", D. M. Moora and R. C. Reaynolds, Oxford University Press, New York, 1997, pp 765, included herein by reference.

Quantitative X-ray diffraction is based on the Rietveld refinement formalism. This algorithm was originally developed by H. M. Rietveld for the refinement of crystal structures. The method is now commonly used in mineralogy and e.g. the cement industry for quantification of mineral phases in unknown samples.

The Rietveld refinement algorithm is based on a calculated fit of a simulated diffraction pattern on a measured diffractogram. First, the mineral phases are determined by assigning peaks of the diffractogram. Based on the minerals determined, the diffractogram is then calculated based on the crystal structure of the minerals present in the sample as well as on equipment and sample specific parameters. In the next steps, the parameters of the model are adjusted to get a good fit of the calculated and the measured diffractogram, e.g. by using the least square-fit method. Details of the method are e.g. described in R. A. Young: "The Rietveld Method", Oxford University Press, 1995. The Rietveld method is able to deal reliably with strongly overlapping reflections in the diffractogram.

For application of this method to the analysis of mineral samples, see e.g. D. K. McCarthy "Quantitative Mineral Analysis of Clay-bearing Mixtures", in: "The Reynolds Cup" Contest. IUCr CPD Newsletter, 27, 2002, 12-16.

In practice the quantitative determination of the different minerals in unknown samples is done by commercially available software, e.g. "Seifert AutoQuan" available from Seifert/GE Inspection Technologies, Ahrensburg, Germany.

Besides the amorphous phase and the smectite phase further minerals may be present in the at least one adsorbent, preferably within a range of 0.1 to 40 wt.-%, more preferred 0.5 to 30 wt.-%, particularly preferred 1 to 20 wt.-% and most preferred 2 to 10 wt.-%. Exemplary side minerals are quartz, cristobalite, feldspar and calcite. Other side minerals may also be present.

The at least one adsorbent further preferably does hardly swell when deposited in water. It therefore may be separated from the crude oil with ease after the contacting according to step b) of the present invention. Preferably the at least one adsorbent has a sediment volume in water after 1 h of less than 15 ml/2 g, more preferred of less than 10 ml/2 g and most preferred of less than 7 ml/2 g.

In a further preferred embodiment, the at least one adsorbent preferably has a cation exchange capacity of more than 40 meq/100 g, particularly preferred of more than 45 meq/100 g and is most preferred selected within a range of 44 to 70 meq/100 g.

In a further preferred embodiment, the at least one adsorbent preferably has a low aluminium content of, calculated as $Al_2O_3$, less than 15 wt.-%, more preferred of less than 10 wt.-%. The aluminium content, calculated as $Al_2O_3$, according to an embodiment is more than 2 wt.-%, according to a further embodiment more than 4 wt.-%.

In a further preferred embodiment, the at least one adsorbent comprises Mg, calculated as MgO, in an amount of less than 7 wt.-%, preferably of less than 6 wt.-%, particularly preferred less than 5 wt.-%. According to an embodiment of the invention, the at least one adsorbent contains magnesium, calculated as MgO, in an amount of at least 0.5 wt.-%, particularly preferred at least 1.0 wt.-%. According to a further embodiment, the at least one adsorbent contains at least 2 wt.-% MgO.

In a further preferred embodiment, the at least one adsorbent contains iron, calculated as $Fe_2O_3$, in amount of less than 8 wt.-%. According to a further embodiment, the iron content, calculated as $Fe_2O_3$, may be less than 6 wt.-% and according to a still further embodiment may be less than 5 wt.-%. According to a further embodiment, the at least one adsorbent may contain iron, calculated as $Fe_2O_3$, in an amount of at least 1 wt.-%, and according to a still further embodiment in an amount of at least 2 wt.-%.

All percentages given for Al, Mg and Fe refer to a dry adsorbent material dried to constant weight at 105° C.

In a further preferred embodiment, the at least one adsorbent preferably reacts neutral to slightly alkaline. A 10 wt.-% suspension of the adsorbent material in water preferably has a pH in the range of 5.5 to 9.0, particularly preferred 5.9 to 8.7 and most preferred 7.0 to 8.5. The pH is determined with a pH-electrode according to DIN ISO 7879.

The adsorbents can be used in their natural form or in a processed form. A processing can be especially performed as a so-called "alkaline activation" or "acid activation"/"acidification". The acidification is especially preferred. Acid activation/acidification is preferably performed with smectites (e.g. with bentonite), attapulgite and sepiolite.

The activation may be performed by treating the at least one adsorbent with acid. By the treatment with acid the treated adsorbent shows an acid reaction. Whereas a 10 wt.-% slurry of the natural adsorbent material has a slightly basic pH of preferably 7.0 to 9.0, after acid activation of the adsorbent material 10 wt.-% slurry has a pH-value of <6.0, preferably 2.5-5.0, and particularly preferred 3.0 to 4.5.

Preferably, the acid-activation is performed by surface activation, i.e. by depositing an acid on the adsorbent material. Activation may be achieved e.g. by spraying an aqueous solution of an acid onto the crude adsorbent material or by milling the adsorbent material together with a solid acid. The adsorbent material preferably is dried before activation to moisture content of less than 20 wt.-% $H_2O$, particularly preferred 10-15 wt.-%. Suitable acids are phosphorous acid, sulphuric acid and hydrochloric acid. Preferred solid acids are citric acid and malic acid. However citric acid and malic acid may be used for activation also in the form of an aqueous solution.

Preferably after deposition of the acid on the adsorbent material there is not performed any washing step but the acid treated adsorbent material is only dried and then ground to suitable particle size.

A preferred acid activation of the adsorbent material is carried out by depositing an amount of acid on the adsorbent material preferably selected within a range of 1 to 10 wt.-%, particularly preferred 2 to 6 wt.-%, calculated as water-free acid and based on the weight of the dry (water-free) adsorbent material. Surprisingly, the pore volume as well as the surface area of the adsorbent material is about the same as the corresponding values of the crude adsorbent material such that it seems that hardly any salt formation occurs during surface activation. Preferably, during surface activation the specific surface area does not alter for more than 20%, preferably not more than 10%.

According to another preferred acid-activation, the adsorbent material is activated in an aqueous phase. Thus, the adsorbent material, preferably in the form of a fine powder, may be preferably dispersed in water. The acid may then be added to the slurry of the adsorbent material e.g. in the form of a concentrated acid. However, according to another preferred activation, the adsorbent material may also be dispersed in an aqueous solution of the acid. According to a preferred embodiment the aqueous acid may be sprayed onto the adsorbent material, which is provided in the form of small lumps or of a fine powder. The amount of water used for preparing the diluted acid is selected to be as small as possible. Residual water on the adsorbent material may be removed after acid activation. The humidity of the adsorbent material preferably is adjusted to be less than 20 wt.-%, particularly preferred less than 10 wt.-%. The activated adsorbent material may then be ground to a suitable size.

According to a further preferred acid-activation, the crude adsorbent material is leached with acid, preferably at elevated temperature, particularly at a temperature corresponding to about 5 to 20° C. less than the boiling point of the mixture. Such method is known e.g. from the production of high performance bleaching earth (HPBE). The leaching is preferably performed with a low amount of acid compared to the amount of acid used in the manufacturing of HPBE. Preferably the amount of acid calculated as water-free acid and referring to the dried (water-free) adsorbent material, is selected within a range of 15 to 40 wt.-%, particularly preferred 20 to 30 wt.-%. Despite of the low amount of acid used for leaching of the adsorbent a significant increase in adsorption activity is achieved which is comparable to HPBE currently offered on the market.

The leaching of the adsorbent is performed in a usual way. The adsorbent material is cooked with the acid. The time for cooking is selected according to the amount of adsorbent material treated. Usually a leaching period of 2 to 12 h is sufficient to achieve the desired increase in bleaching activity. The slurry of the leached adsorbent material is then filtered and the solid adsorbent material is washed with water to remove salts that have formed during the acid treatment, and residual acid.

Surprisingly, the specific surface area as well as the pore volume of the adsorbent is not altered much during acid leaching. The adsorbent material treated with boiling or hot acid has a pore volume and a specific surface area that is preferably not enlarged by more than 20%. As a further advantage, the yield of the acid leaching is quite high. Preferably, the yield is in a range of 80 to 95%, based on the dry adsorbent material. For the acid leaching, preferably strong inorganic acids are used. Particularly preferred acids are sulphuric acid and phosphoric acid.

EXAMPLES

The following examples and FIGURE are presented in order to more fully explain and illustrate the invention. The examples are not to be construed as limiting the invention.

FIG. 1 shows the contents of sterylglycosides, acylated sterylglycosides and phosphor after treatment with different adsorbents (1%) at 40° C. in soybean oil when pre-degummed with 5% water and after-degummed with 2% water.

The physical features used to characterize the adsorbents used in the method according to the invention are determined as follows:

Specific Surface and Pore Volume

Specific surface and pore volume is determined by the BET-method (single-point method using nitrogen, according to DIN 66131) with an automatic nitrogen-porosimeter of Micrometrics, type ASAP 2010. The pore volume was determined using the BJH-method (E. P. Barrett, L. G. Joyner, P. P. Hienda, J. Am. Chem. Soc. 73 (1951) 373). Pore volumes of defined ranges of pore diameter were measured by summing up incremental pore volumina, which were determined from the adsorption isotherm according BJH. The total pore volume refers to pores having a diameter of 2 to 350 nm. The measurements provide as additional parameters the micropore surface, the external surface and the micropore volume. Micropores refer to pores having a pore diameter of up to 2 nm according to Pure & Applied Chem. Vol. 51, 603-619 (1985).

Humidity

The amount of water present in the adsorbent material at a temperature of 105° C. was determined according to DIN/ISO-787/2.

Silicate Analysis

The adsorbent material was totally disintegrated. After dissolution of the solids the compounds were analysed and quantified by specific methods, e.g. ICP.

a) Sample Disintegration

A 10 g sample of the adsorbent material is comminuted to obtain a fine powder which is dried in an oven at 105° C. until constant weight. About 1.4 g of the dried sample is deposited in a platinum bowl and the weight is determined with a precision of 0.001 g. Then the sample is mixed with a 4 to 6-fold excess (weight) of a mixture of sodium carbonate and potassium carbonate (1:1). The mixture is placed in the platinum bowl into a Simon-Müller-oven and molten for 2 to 3 hours at a temperature of 800-850° C. The platinum bowl is taken out of the oven and cooled to room temperature. The solidified melt is dissolved in distilled water and transferred into a beaker. Then concentrated hydrochloride acid is carefully added. After evolution of gas has ceased the water is evaporated such that a dry residue is obtained. The residue is dissolved in 20 ml of concentrated hydrochloric acid followed by evaporation of the liquid. The process of dissolving in concentrated hydrochloric acid and evaporation of the liquid is repeated once again. The residue is then moistened with 5 to 10 ml of aqueous hydrochloric acid (12%). About 100 ml of distilled water is added and the mixture is heated. To remove insoluble $SiO_2$, the sample is filtered and the residue remaining on the filter paper is thoroughly washed with hot hydrochloric acid (12%) and distilled water until no chlorine is detected in the filtrate.

b) Silicate Analysis

The $SiO_2$ is incinerated together with the filter paper and the residue is weighed.

c) Determination of Aluminium, Iron, Calcium and Magnesium

The filtrate is transferred into a calibrated flask and distilled water is added until the calibration mark. The amount of aluminium, iron, calcium and magnesium in the solution is determined by FAAS.

d) Determination of Potassium, Sodium and Lithium

A 500 mg sample is weighed in a platinum bowl with a precision of 0.1 mg. The sample is moistened with about 1 to 2 ml of distilled water and then four drops of concentrated sulphuric acid are added. About 10 to 20 ml of concentrated hydrofluoric acid is added and the liquid phase evaporated to dryness in a sand bath. This process is repeated three times. Finally $H_2SO_4$ is added to the dry residue and the mixture is evaporated to dryness on an oven plate. The platinum bowl is calcined and, after cooling to room temperature, 40 ml of distilled water and 5 ml hydrochloric acid (18%) is added to the residue and the mixture is heated to boiling. The solution is transferred into a calibrated 250 ml flask and water is added up to the calibration mark. The amount of sodium, potassium and lithium in the solution is determined by EAS.

Loss on Ignition

In a calcined and weighed platinum bowl about 0.1 g of a sample are deposited weighed in a precision of 0.1 mg. The platinum bowl is calcined for 2 hours at 1000° C. in an oven. Then the platinum bowl is transferred to an exsiccator and weighed.

Ion Exchange Capacity

The adsorbent material to be tested is dried at 150° C. for two hours. Then the dried material is allowed to react under reflux with a large excess of aqueous $NH_4Cl$ solution for 1 hour. After standing at room temperature for 16 hours, the material is filtered. The filter cake is washed, dried, and ground, and the $NH_4$ content in the adsorbent material is determined by the Kjedahl method. The amount and kind of the exchanged metal ions is determined by ICP-spectroscopy.

XRD

The XRD spectra are measured with a powder diffractometer X'-Pert-MPD(PW 3040) (Phillips), equipped with a Cu-anode.

Determination of the Sediment Volume:

A graduated 100 ml glass cylinder is filled with 100 ml of distilled water or with an aqueous solution of 1% sodium carbonate and 2% trisodium polyphosphate. 2 g of the compound to be analysed is placed on the water surface in portions of about 0.1 to 0.2 g with a spatula. After sinking down of a portion, the next portion of the compound is added. After adding 2 g of the compound to be analysed the cylinder is held at room temperature for one hour. Then the sediment volume (ml/2 g) is read from the graduation.

Determination of Montmorillonite Proportion by Methylene Blue Adsorption a) Preparation of a Tetrasodium Diphosphate Solution
5.41 g tetrasodium diphosphate are weighed with a precision of 0,001 g in a calibrated 1000 ml flask and the flask is filled up to the calibration mark with distilled water and shaken repeatedly.

b) Preparation of a 0.5% Methylene Blue Solution
In a 2000 ml beaker, 125 g methylene blue is dissolved in about 1500 ml distilled water. The solution is decanted and then distilled water is added up to a volume of 25 l.
0.5 g moist test bentonite having a known inner surface are weighed in an Erlenmeyer flask with a precision of 0.001 g. 50 ml tetrasodium diphosphate solution are added and the mixture is heated to boiling for 5 minutes. After cooling to room temperature, 10 ml $H_2SO_4$ (0.5 m) are added and 80 to 95% of the expected consumption of methylene blue solution is added. With a glass stick a drop of the suspension is transferred to a filter paper. A blue-black spot is formed surrounded by a colourless corona. Further methylene blue solution is added in portions of 1 ml and the drop test is repeated until the corona surrounding the blue-black spot shows a slightly blue colour, i.e. the added methylene blue is no longer adsorbed by the test bentonite.

c) Analysis of Adsorbent Materials
The test of the adsorbent material is performed in the same way as described for the test bentonite. On the basis of the spent methylene blue solution is calculated the inner surface of the adsorbent material.
According to this method 381 mg methylene blue/g adsorbent correspond to a content of 100% montmorillonite.

Determination of Particle Size (Dry Sieve Residue)

Through a sieve cloth, a vacuum cleaner connected with the sieve aspirates over suction slit circling under the perforated sieve bottom all particles being finer than the inserted sieve being covered on top with an acrylic glass cover and leaves the coarser particles on the sieve. The experimental procedure is as follows: Depending on the product, between 5 and 25 g of air dried material is weighed in and is put on the sieve. Subsequently, the acrylic glass cover is put on the sieve and the machine is started. During air jet screening, the screening process can be facilitated by beating on the acrylic glass cover using the rubber hammer. Exhaustion time is between 1 and 5 minutes. The calculation of the dry screening residue in % is as follows: actual weight multiplied with 100 and divided by the initial weight.

Apparent Weight

A calibrated 1 l glass cylinder cut at the 1000 ml mark is weighed. By a powder funnel the sample is poured into the cylinder in a single step such that the cylinder is completely filled and a cone is formed on top of the cylinder. The cone is removed with help of a ruler and material adhering to the outside of the cylinder is removed. The filled cylinder is weighed again and the apparent weight is obtained by subtracting the weight of the empty cylinder.

Triglyceride Analysis a) Determination of the Phosphorous Content
Phosporous content in the oil samples was analysed with ICP AES according to DEV E-22.

b) Analysis of the Sterylglycoside Content
Sterylglycoside analyses were performed externally at ASG, Neusäβ.

Determination of the Sterylglycoside and Acylated Sterylglycoside Content by Means of Analytical Thin Layer Chromatography The chemicals needed are heptane, MTBE (methyl, tertiary butylether), acetone, methanol, pyridine, THF, water, DIBK (diisobutylketone) and acetic acid. The measuring range is between 5 to 1500 mg/kg.

1. Sample Preparation by Means of Solid Phase Extraction (SPE)

2 g biodiesel or vegetable oil is weighed in Sarstedt tubes and the weight is noted down. 15 drops pyridine (p. A.) are added and shaken. The sample should be clear. The preparation is then diluted with 8 ml heptane/MTBE in the ratio 2:1 and shaken again. Commercially available SPE cartridges (silica gel) are conditioned with approx. 4 ml heptane (technical). After conditioning, the diluted sample is put into the SPE cartridge. When the complete material is transferred, it is washed with 5 ml heptane/MTBE (ratio 2:1). Then the SPE cartridge is set on a new test tube and acylated sterylglycosides as well as sterylglycosides are eluated with 4 ml acetone and 4 ml methanol. Afterwards it is evaporated to dryness in the heating block under $N_2$ stream. The residue is solved in 1 ml $THF/H_2O$ in a ratio of 9:1 and filled in the GC vial.

2. Coating on Thin Layer Chromatography (TLC) Plate

By means of a coating tool the sample is put on the TLC plate with three dilutions each of the acylated sterylglycoside respectively sterylglycoside calibration standards.

3. Development and Immersion of the TLC Plate 4 ml solvent mixture, i.e. 90 DIBK, 25 acetic acid, $5H_2O$, are filled in the horizontal TLC chamber. The TLC plate is put in the chamber with the glass side upwards. The TLC plate is removed when the solvent front has reached half of the length of the TLC plate. After this, the plate is dried in the drying oven under vacuum at 150° C. for 20 to 30 min. After cooling down the plate to room temperature, the preparation is immersed in Cu(II) acetate solution (Cu(II) acetate in 10% solution of (aqueous) H₃PO₄) for 2 seconds. The backside of the plate is then dried, lakes formed on the front side are blow-dried. Plate is developed at 90° C. for 5 minutes in the oven until all levels are visible.

4. Scan, Evaluation of the TLC Plates

The plate is put in the commercially available device and is then scanned. The result is calculated on a calibration curve previously set up with solutions of pure sterylglycosides and acylated sterylglycosides.

Example 1

Adsorbents Under Investigation

The adsorbent materials used in the examples according to the invention as well as in the comparative examples are described in the following. For the bleaching earths the characteristic properties are shown in table 3.

TABLE 3 properties of bleaching earths

| Adsorbent | Bleaching Earth 1 | Bleaching Earth 2 | Bleaching Earth 3 | Bleaching Earth 4 |
|---|---|---|---|---|
| Type | natural | SMBE | SMBE | HPBE |
| Dry sieve residue on 45 μm (%) | 49 | 49 | 53 | 40 |
| Dry sieve residue on 63 μm (%) | 35 | 38 | 41 | 29 |
| apparent weight (g/l) | 292 | 350 | 380 | 550 |
| Methylene blue adsorption (mg/g sample) | 106 | n.d. | n.d. | n.d. |
| Moisture content (%) | 8 | 9.7 | 8.1 | 10 |
| pH (10 wt.-% in water) | 7.6 | ~3 | 2-4 | 2.2-4.8 |
| cation exchange capacity (meq/100 g) | 52 | n.d. | 47 | 32 |
| BET surface (m²/g) | 208.4 | 225 | 190 | 200 |
| micropore volume (cm³/g) | 0.016 | 0.87 (ml/g) | 0.64 (ml/g) | 0.29 (ml/g) |
| cumulative pore volume (BJH) for pore diameter 1.7-300 nm (cm³/g) | 0.825 | n.d. | n.d. | n.d. |
| average pore diameter (BJH) (nm) | 16.4 | n.d. | n.d. | n.d. |
| sediment volume (ml/2 g) | 5.5 | n.d. | n.d. | n.d. |

Bleaching earth 1 is a natural bleaching earth, bleaching earths 2 and 3 are surface modified bleaching earths (SMBE), bleaching earth 4 is a high performance bleaching earth (HPBE).

In addition to bleaching earth the following commercial products based on synthetic oxide compounds:

Trisyl® 300 (silica gel for degumming, Grace)
Pural® SB (Boehmite, Sasol, Hamburg)
Siral® 45 (alumosilicate, Sasol, Hamburg)

For some of the following experiments bleaching earths and commercially available products were blended.

Example 2

Purification of Crude Soybean Oil

Crude soybean oil with 170 ppm P, 152 ppm acylated sterylglycosides and 24 ppm non acylated sterylglycosides is pre-degummed with 5 wt.-% of water by stirring at 40° C. for 1 h. Phase separation is performed by 15 min centrifugation at 4000 Rpm. The oil phase is completely recovered. Samples of 20 g of the residual oil phase are taken, 1 wt.-% of adsorbent is added, followed by 1 h stirring at 40° C. Then, 2 wt.-% of water are added and the mixture is stirred for another 30 min at 40° C. Afterwards, centrifugation is performed for 15 min at 4000 Rpm and the oil phase is isolated and analysed with respect to the P-content and the sterylglycoside content according to the analytical methods described before. The results are summarized in table 6 and FIG. 1. (In FIG. 1 the sterylglycoside concentration of the non-acylated form is not shown as all adsorbents reduce the content of the latter below the detection limit).

TABLE 6

Concentration of impurities in soybean oil before and after adsorbent treatment

| Soybean oil F 1818 | Sterylglyco-side (non-acylated) | Acetylated steryl-glycosides | Phosphorous [ppm] |
|---|---|---|---|
| crude oil | 24 | 152 | 170 |
| pre-deg. | 10 | 48 | 110 |
| Bleaching earth 2 | <5 | 33 | 56 |
| Bleaching earth 1 | <5 | 48 | 75 |
| Siral ® 45 | <5 | 16 | 11 |
| Trisyl ® 300 | <5 | 59 | 61 |
| Pural ® SB | <5 | 11 | 100 |
| Bleaching earth 4 | <5 | 46 | 115 |
| Bleaching earth 3 | <5 | 36 | 77 |
| Pural ® SB/Bleaching earth 1 (0.25% + 0.75%) | <5 | 24 | 75 |
| Pural ® SB/Bleaching earth 2 (0.25% + 0.75%) | <5 | 22 | 70 |
| Pural ® SB/Siral ® 45 (0.25% + 0.75%) | <5 | 11 | 32 |

The data demonstrate that state of the art materials for oil treatment like high performance bleaching earth and silica gel show only limited reduction of both, P and sterylglycosides in acylated form. Superior effects can be achieved with natural bleaching earths, SMBEs and alumosilicates. Boehmite is especially suitable for reduction of sterylglycosides and can be used in mixtures with other inorganic synthetic compounds. As mixing components it is especially suitable to increase the adsorption capacity of adsorbents for acylated sterylglycosides.

Example 3

Treatment of a Soybean/Palm Oil Mixture

A predegummed soybean/palm oil mixture with 5.8 ppm P is treated with the bleaching earth 3 with dosages from 0.8 to 2.0 wt.-%. The complete results of bleaching, metal removal, P reduction and sterylglycoside content of the treated oil are presented in table 7.

TABLE 7 bleaching, metal removal, P reduction and sterylglycoside content of the oil treated with bleaching earth 3

| | | | | | \multicolumn{2}{c}{bleaching} | | | | | | | | | | | |
|---|---|---|---|---|---|---|---|---|---|---|---|---|---|---|---|---|---|
| | | | | | \multicolumn{2}{c}{PFX 995-m 5¼"} | | | | | | | | | | steryl- | acyl-steryl- |
| bleaching earth | dos. (%) | temp. (°C) | time (min) | pressure (mbar) | red | yellow | Chl. A (ppm) | Fe | Al | Cu | Ca | Mg | Na | P | S | glycosides | glycosides |
| | | | | | | | | | | | (ppm) | | | | | (ppm) | |
| unbleached, unfiltered | | | | | | | | <0.1 | <0.1 | <0.1 | 0.3 | 0.5 | 19 | 15 | 5 | 10 | 88 |
| unbleached, 1" filtered | | | | | 3.6 | 70+ | 1.01 | <0.1 | <0.1 | <0.1 | 0.3 | 0.3 | 8.0 | 5.8 | 4 | <5 | 59 |
| Tonsil 9192 FF (B 2356 A) | 0.8 | 95 | 10 | 30 | 3.8 | 70+ | 0.06 | <0.1 | <0.1 | <0.1 | <0.1 | 0.1 | <1 | 0.9 | 3 | <5 | 65 |
| Tonsil 9192 FF (B 2356 A) | 1.5 | 95 | 10 | 30 | 2.3 | 70+ | 0.01 | <0.1 | <0.1 | <0.1 | <0.1 | <0.1 | <1 | <0.8 | 2 | <5 | 50 |
| Tonsil 9192 FF (B 2356 A) | 2.0 | 95 | 10 | 30 | 2.1 | 70+ | 0.00 | <0.1 | <0.1 | <0.1 | <0.1 | <0.1 | <1 | <0.8 | 2 | <5 | 34 |

Bleaching: ... % b.e., 95° C., 10 min, 30 mbar

The results show that with increasing dosage of surface-modified bleaching earth, the content of acyl-sterylglycosides is lowered. In parallel the P content is reduced to less than 20% of the original value already with the lowest dosage of bleaching earth 3.

The invention claimed is:

1. A method for the production of biodiesel, comprising the steps of:
   a) Providing crude oil with a phosphorus-content of more than 10 ppm and a sterylglycoside-content of more than 5 ppm;
   b) contacting said crude oil from step a) with at least one adsorbent to form a biodiesel precursor, wherein the at least one adsorbent comprises a matrix formed from amorphous silica gel and a smectite phase, wherein the amorphous silica gel is comprised in the adsorbent in an amount of at least 25 wt. % and the smectite phase is present in an amount of at least 10 wt. % and less than 60 wt. %, wherein the adsorbent further has:
   an aluminum content, calculated as $Al_2O_3$, of more than 2 wt. % and less than 15 wt. %;
   a silicon content, calculated as $SiO_2$, of at least 45 wt. % and less than 95 wt. %;
   a BET surface of at least 100 m$^2$/g;
   a total pore volume of at least 0.2 ml/g; and
   a cation exchange capacity of more than 40 meq/100 q;
   c) separating the adsorbent from the biodiesel precursor; and
   d) subjecting the biodiesel precursor obtained from step c) to a biodiesel production process.

2. The method according to claim 1, further comprising the step of:
   e) obtaining biodiesel compliant with the EU norm EN 14214 regarding the contents of phosphorus and sterylglycosides from step d).

3. The method according to claim 1, wherein the at least one adsorbent is added in an amount from 0.1 to 10 weight-% to the crude oil.

4. The method according to claim 1, wherein the contacting according to step b) of the crude oil and the at least one adsorbent is carried out at a temperature of from 10 to 100° C.

5. The method according to claim 1, wherein the crude oil is subjected to a pre-degumming process before contacting the crude oil with at least one adsorbent.

6. The method according to claim 1, wherein the surface area according to BET of the at least one adsorbent is at least 120 m$^2$/g.

7. The method according to claim 1, wherein the total pore volume according to BJH of the at least one adsorbent is at least 0.35 ml/g.

8. The method according to claim 1, wherein the Si-content (calculated as $SiO_2$) of the at least one adsorbent is at least 45 weight-%.

9. The method according to claim 1, wherein at least 60 of the pores of the at least one adsorbent have a pore diameter of at least 140 A.

10. The method according to claim 1, wherein the at least one adsorbent is selected from the group consisting of clays, organic oxides, synthetic inorganic oxides, and mixtures thereof.

11. The method according to claim 10, wherein the at least one adsorbent is selected from the group consisting of pyrophyllites, sepiolites, attapulgites, smectites, vermiculites, Si-oxides, Al-oxides, Mg-oxides, Zn-oxides, Ti-oxides, alumosilicates and mixtures thereof.

* * * * *